…

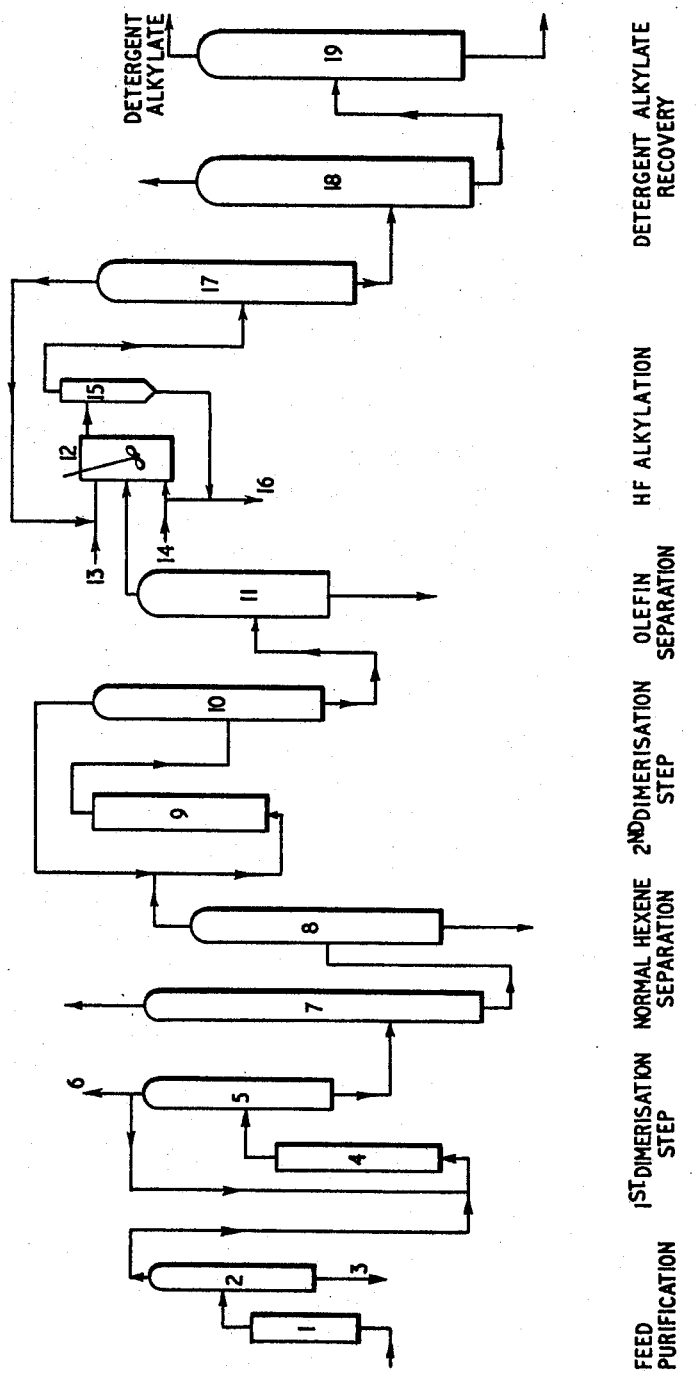

United States Patent Office 3,442,965
Patented May 6, 1969

3,442,965
PRODUCTION OF DETERGENT ALKYLATE AND OF OLEFINES SUITABLE FOR PREPARING SUCH DETERGENT ALKYLATES
Wilfred John Oldham, Falkirk, Scotland, assignor, by mesne assignments, to British Hydrocarbon Chemicals Limited, London, England
Continuation-in-part of application Ser. No. 280,449, May 14, 1963. This application May 11, 1966, Ser. No. 554,271
Claims priority, application Great Britain, June 1, 1962, 21,257/62
Int. Cl. C07c 3/10, 3/52, 3/34
U.S. Cl. 260—671   20 Claims

ABSTRACT OF THE DISCLOSURE

Detergent alkylates are prepared by alkylating an aromatic hydrocarbon with a branched chain olefin having from 10–16 carbon atoms. The branched chain olefins are prepared by dimerizing straight chain $C_5$–$C_8$ mono-olefins with a catalyst comprising a synthetic petroleum cracking catalyst which may also contain an oxide of nickel, cobalt, manganese or chromium.

---

The present invention relates to the production of detergent alkylate which is biodegradable on sulphonation and is a continuation in part of my co-pending application Ser. No. 312,611 filed Sept. 30, 1963, of my co-pending application Ser. No. 280,449 filed May 14, 1963, and of my co-pending application Ser. No. 364,277 filed May 1, 1964, all of which are now abandoned.

The preparation of detergent alkylate fractions having an alkyl chain length of about $C_{10}$ to $C_{16}$ which give alkylbenzene sulphonate detergents, which can be readily metabolised by sewage bacteria, has recently assumed considerable importance. Hitherto it has been thought that the use of straight chain alkylbenzenes was necessary to give biologically degradable alklybenzene sulphonates, in contrast to the conventional branched-chain alkylbenzene sulphonates, derived for instance from propylene tetramer.

It has been proposed to produce biodegradable detergents by dimerizing hexene-2 over a complex catalyst of the Ziegler type and alkylating benzene with the resulting dimer. The detergent alkylate so produced is stated to give a biodegradable detergent on sulphonation. However, dimerization was relatively slow and with the Ziegler catalyst systems used the process of dimerization and product recovery was relatively complex and costly. In particular the catalysts used were expensive to make, sensitive to poisons and difficult to separate from the hydrocarbon product, whilst our catalysts largely avoid these problems, as well as giving very high efficiencies of dimer formation.

It has now been discovered that detergent alkylate fractions can be produced, which give biologically degradable alkylbenzene sulphonates, but which do not consist predominantly of singly branched or straight chain alkylbenzenes, and which are made by dimerization of olefines over catalysts which give rapid rates of reaction and which are easier to use and handle than organometallic catalyst systems.

According to one aspect of the present invention, the process for the production of detergent alkylate comprises dimerizing a straight chain mono-olefine in the $C_5$ to $C_8$ carbon number range over a catalyst comprising a transition metal oxide or a synthetic petroleum cracking catalyst and condensing a fraction of the dimerization product in the $C_{10}$ to $C_{16}$ carbon number range with an aromatic hydrocarbon in the presence of an alkylation catalyst.

The starting materials for the process of the present invention are straight chain mono-olefines having carbon numbers in the range $C_5$ to $C_8$. The feedstock may be obtained in any suitable manner, for instance as a fraction of the products of thermally cracking a high molecular weight paraffinic hydrocarbon, preferably after purification to remove sulphur compounds, diolefines and acetylenic hydrocarbons. Other suitable feedstocks are obtained by polymerization of lower olefines, especially ethylene, propylene or butene and isolation of a fraction from the polymer consisting of straight chain mono-olefines having 5 to 8 carbon atoms.

According to one aspect of the invention the $C_5$ to $C_8$ straight chain olefine is prepared by dimerizing propylene in the presence of a catalyst to form a product containing a substantial proportion of normal hexenes, and separating from the product a fraction consisting substantially of normal hexenes.

The propylene used as feedstock to this dimerization reaction may be pure propylene, or a fraction containing propylene, for example a $C_3$ fraction from catalytic cracking, from a steam cracking process, or from thermal cracking operation. Since the catalysts for the propylene dimerization step are impaired by large amounts of acetylenes or propadiene, it is preferred that when these are present the $C_3$ feedstock be pre-treated, for example by conventional selective hydrogenation processes, to remove most of these compounds prior to the propylene dimerization step. Sulphur compounds, water, and carbon monoxide also adversely affect the performance of catalysts for propylene dimerization. It is also preferred that the $C_3$ feedstock be free of higher boiling contaminants, particularly isobutene and branched hydrocarbons likely to form impurities in the dimerization step which would be difficult to separate from the normal hexenes produced. Propane functions merely as a diluent in this step, and its presence can therefore be tolerated.

The catalysts used in the dimerization of the propylene are those which will give dimerization products containing a substantial proportion of normal hexenes. It is preferred to use transition metal oxide catalysts since these give high yields of normal hexenes from propylene and produce only small amounts of branched chain isomers which are difficult to separate. The preferred transition metal oxide catalyst is an oxide or oxides of nickel, cobalt, or chromium or mixtures thereof, and the use of nickel oxide catalysts is particularly preferred for this step. The catalysts may be supported on carriers such as silica, silica gel or a silica/alumina cracking catalyst. A silica/alumina support is preferred. The preparation of transition metal oxide catalysts of this type is described, for instance, by Holm et al. in Ind. Eng. Chem. 49, 250, 1957. These catalysts are activated by heating in air or oxygen at temperatures up to about 800° C., and periodic reactivation of the catalysts may be carried out similarly.

The dimerization of the propylene is suitably carried out at temperatures in the range of about 20 to 150° C. and preferably 40–80° C., desirably under sufficient pressure to maintain the reactants in the liquid phase. An inert solvent, liquid under the reaction conditions, such as a low ($C_5$) paraffin may be used if desired.

The dimerization is preferably carried out with incomplete conversion of propylene for instance from 30–80% in order to minimise the formation of propylene polymers higher than the dimer but where other uses for higher polymers exist their formation may be no disadvantage and high propylene conversions can be used.

The separation from the propylene dimerization product of a fraction consisting substantially of normal hexenes may be carried out by known methods, using for instance molecular sieves, urea adduction or fractional distillation. Fractional distillation is the preferred method for carrying out this separation, which is critical in that no large amounts of branched chain hydrocarbons must be allowed to pass with the normal hexenes to the second dimerization step. The main branched chain isomer formed in the dimerization of the propylene is 4-methyl-2-pentene, and the fractional distillation should be operated so as to separate this isomer substantially completely from the normal hexene fraction. Suitably the propylene dimerization product is first distilled to separate unconverted propylene and the propane (if any is present), which may be recycled to the dimerization reactor; with feedstocks containing a high proportion of propane, withdrawal of a purge stream from the recycle propylene may be necessary to prevent build-up of propane in the system. After removal of unconverted propylene, the dimerization product is then distilled to separate a distillate fraction consisting of methylpentenes, mainly 4-methyl-2-pentene, and the residue is further distilled to recover a normal hexene distillate fraction, which is mainly a mixture of hexane-2 and -3 with some hexene-1 leaving as residue trimers and higher polymers of propylene. The methylpentene fraction is a valuable by-product of the process, and may be converted, for instance, by double bond isomerization into a product which yields substantial amounts of isoprene on cracking.

Suitable $C_5$–$C_8$ straight chain olefine fractions can also be made by dehydrogenation of $C_5$–$C_8$ normal paraffins. In this case the dehydrogenation product may be fed to the dimerization reaction, and a fraction containing unreacted $C_5$ to $C_8$ normal paraffins recovered from the product and recycled to the dehydrogenation reactor. The position of the double bond in the molecule is not critical in the $C_5$–$C_8$ olefine feedstock, but the starting material should not contain an appreciable proportion of branched chain olefines. The presence of saturated and aromatic hydrocarbons in the feedstock can be tolerated, since these do not materially affect the dimerization step; it is however preferred to use feedstocks not containing substantial amounts of such hydrocarbons particularly if it is desired to recycle monomeric olefine separated from the dimerization product. It is preferred to operate the $C_5$–$C_8$ olefine dimerization step at relatively low conversion per pass, and to recycle recovered monomer, since this gives higher yields of the required detergent olefine fraction.

An essential feature of the process is that high yields of dimers in the range $C_{10}$ to $C_{16}$ are produced which can be converted into biodegradable alkylbenzene sulphonates. These dimers are much superior in this respect to the low olefine polymers of the prior art.

The preferred transition metal oxide catalyst for the dimerization of the $C_5$ to $C_8$ olefines is an oxide or oxides of nickel, cobalt, maganese or chromium or mixtures thereof, and manganese oxide is a particularly suitable catalyst. The catalysts are preferably deposited on supports such as silica, silica gel or a silica/alumina cracking catalyst. One method for preparing transition metal oxide catalysts of this type is described, for instance, by Holm et al. in Ind. Eng. Chem. 49, 250, 1957. Periodic reactivation of the catalysts may be carried out by heating in air.

Other catalysts which may be used are the synthetic substances used in the cracking of petroleum. Typical examples of these are silica/alumina, silica/magnesia, silica/zirconia and silica/boria catalysts. The preferred catalyst is silica/alumina, suitably containing between about 70% and about 90% by weight of silica, although the proportion of silica to alumina may vary within moderately wide limits. The catalysts may be prepared in any suitable manner, and may be activated if desired, for instance by heating in air or inert gas such as nitrogen. Catalyst activation temperatures in the range from about 350° C. to about 650° C. are preferred. The activity of the catalyst tends to decline with long continued use, owing partly to the deposition of carbon on the catalyst surface, and may be restored in the conventional way, for instance by heating the catalyst in air to burn off the carbon. Generally these synthetic petroleum cracking catalysts can be operated for long periods without burning off the carbon. In this way treatment with an inert gas at high temperatures, preferably in excess of 150° C., will also restore lost activity at least partially without burning off the carbon. However, the selectivity of the catalyst for the dimerization reaction remains at a high level, and is not lowered by these treatments.

The dimerization step is suitably carried out at temperatures in the range of about 20 to 150° C. and preferably from 70 to 130° C., although with synthetic petroleum cracking catalysts good results may also be obtained at temperatures down to about 50° C. while it may be slightly less advantageous to work at temperatures above 100° C. The dimerization is preferably carried out under sufficient pressure to maintain the reactants in the liquid phase. Suitable pressures are in the range 20 to 500 p.s.i.g., but higher and lower pressures can be used. Flow rates of olefines in the range 0.1 to 10 volumes of liquid olefine per volume of catalyst per hour are suitable. When dimerizing the normal hexene fraction produced by propylene dimerization it will be seen that the conditions are broadly similar to those in the propylene dimerization step except that lower presures are generally used.

The olefinic product from the second dimerization step is treated, preferably by fractional distillation, to separate a fraction containing the $C_5$–$C_8$ normal olefine dimers, and within the $C_{10}$ to $C_{16}$ carbon atom range, but preferably extending over a range of not more than 5, and suitably not more than 4, carbon numbers, for use in the condensation reaction. Suitably the dimerization product is first distilled to separate as distillate unpolymerized normal $C_5$–$C_8$ olefines, which can be recycled. The product is then fractionated, preferably under reduced pressure, to separate as distillate the required fraction containing the normal $C_5$–$C_8$ olefine dimers. Where the $C_5$–$C_8$ olefine consists of n-hexenes this fraction consists primarily of dimers of normal hexenes and in a preferred embodiment the fractionation is carried out so as to separate substantially only dimers of normal hexenes as an overhead fraction. Generally under preferred conditions the product from the second dimerization step contains little or no material other than $C_{12}$ olefines. However, in one embodiment of the invention the feed to the second dimerization step includes, in addition to the normal hexene distillate fraction prepared by propylene dimerization straight chain mono-olefines within the carbon number range $C_5$ to $C_8$ produced by other means as described above. The products of the dimerization step are mostly olefines containing two or more branches in the chain, and only a small proportion of singly branched or normal olefines, such as n-dodecene. The production of biologically degradable alkylbenzene sulphonates from these products is therefore surprising.

The recovered dimer fraction is condensed by known methods with an aromatic hydrocarbon in the presence of a suitable alkylation catalyst such as aluminium chloride or anhydrous hydrogen fluoride. The aromatic hydrocarbon may be, for instance, benzene, toluene, xylenes or naphthalene; it is preferred to use benzene. The preferred alkylation catalyst is hydrogen fluoride, which gives low proportions of unwanted low-boiling and high-boiling products. The condensation is suitably carried out in the liquid phase at a temperature in the range of about −20 to +100° C.

The alkylation product, after separation of the catalyst, is suitably fractionated to recover unreacted benzene for recycle, a small light alkylate fraction and a distillate detergent alkylate fraction, leaving a small residue of heavy alkylate.

A particular embodiment of the process of the present invention is illustrated with reference to the accompanying drawing in the form of a flow diagram.

A steam cracked $C_3$ fraction containing approximately 95% of propylene, and small amounts of acetylenes and propadiene is treated with the required amount of hydrogen in a selective hydrogenation reactor 1 to reduce the amount of acetylenes and propadiene present, since these reduce the life of the dimerization catalyst used. The treated propylene passes (after cooling and drying) to the still 2, where a small amount of polymeric material is left as residue and withdrawn by line 3, treated polymer-free propylene passing overhead to the first dimerization reactor 4. This reactor is charged with nickel oxide on silica/alumina catalyst, and maintained at a temperature in the range of 20–150° C., preferably 40–80° C., under sufficient pressure to maintain liquid phase conditions. Normally about 30–80% of the propylene is converted to dimer and higher polymers in this reactor although higher conversions can be used with some loss of dimer yield based on propylene reacted. The total reaction product is passed to the fractionator 5. In this unconverted propylene and the propane present is taken overhead and recycled to the dimerization reactor 4. Propane is allowed to build up in this recycle stream until sufficient propane and unconverted propylene is present in the total feed to the dimerization reactor 4 to provide enough diluent to absorb the heat evolved in the dimerization reaction as sensible heat of reactants plus diluent; any excess may be purged from the system by the line 6 as required to maintain the feed composition at the desired level. Other well known means can of course be used to control the temperature of the reaction if desired. The residue from fractionator 5 consisting of dimers and higher polymers of propylene is fed to the fractionator 7. In this the methylpentenes, predominantly 4-methylpentene-2, are removed as overhead distillate and the residue is passed to the still 8. This recovers a normal hexene distillate, which is mainly a mixture of hexene-2 and -3 with some hexene-1, and leaves as residue trimers and higher polymers of propylene. The normal hexenes pass to the second dimerization reactor 9, where they are contacted with a manganese oxide on silica/alumina catalyst to form dimers of the normal hexenes. The conversion in this step is kept relatively low to avoid forming high-boiling by-products, and the total products pass to the fractionator 10. This fractionator removes normal hexenes as distillate, which are returned to the reactor 9. The residue from fractionator 10, consisting of dimers of normal hexenes with a small amount of higher polymers is passed to fractionator 11. This is operated under reduced pressure to produce a distillate olefine fraction consisting predominantly of dimers of normal hexenes and to discard a small residue of higher polymers. The olefine distillate is passed to the HF alkylation system 12. To this is also fed fresh and recycle benzene by the line 13 and make up and recycle liquid anhydrous hydrogen fluoride by the line 14 respectively. The alkylation is carried out under conventional conditions using a molar excess of benzene (suitably 5:1 to 20:1) over the olefine. The total product from reactor 12 passes to the phase separator 15, where the HF layer is withdrawn and returned to the reactor 12. A purge stream of hydrogen fluoride is withdrawn by the line 16; this is purified by distilling from polymeric material which otherwise builds up in the system, and can then be returned to the system. The hydrocarbon layer from phase separator 15 passes to the fractionator 17; here unreacted benzene is distilled off overhead together with the bulk of the HF remaining dissolved in the hydrocarbon and returned to the alkylator 12. The residue from fractionator 17 is passed to a wash system suitably using aqueous potassium hydroxide (not shown) to remove any remaining traces of hydrogen fluoride, and fractionated in column 18 (which is suitably operated under slightly reduced pressure) to take overhead any lower boiling material present and to correct the initial boiling point of the detergent alkylate product to the required level, and the residue passed to the fractionator 19. This is operated under reduced pressure to give a detergent alkylate overhead distillate product which is withdrawn to storage, and a high boiling by-product (heavy alkylate) residue.

The process of the invention is further illustrated with reference to the following examples, in which all parts and percentages are by weight.

EXAMPLE 1

A nickel/silica alumina catalyst was prepared according to the method described by Holm et al. Ind. Eng. Chem. 49, 250 (1957).

A hexene-1 feedstock was passed in the liquid phase through a bed of this catalyst at a rate of 0.96 gms./gm. catalyst/hour, the temperature being 80–90° C. and the pressure 400 p.s.i.g. The product was recovered and fractionated giving 11% of polymer, of which 80% was the required dimer. The recovered monomer (89% of the total) contained about 20% hexene-1, the remainder being a mixture of hexene-2 and hexene-3. The double bond isomerization of the monomer was rapid compared with the dimerization, so that the position of the double bond in the feedstock is not critical. No measurable skeletal isomerization of the feed occurred.

The dimer fraction so obtained was reacted with excess benzene (20 moles benzene:1 mole dimer) with anhydrous fluoride as catalyst separated. Fractionation of the hydrocarbon product under reduced pressure gave a very small light alkylate fraction, and the main detergent alkylate product of boiling range between 258–294° C./760 mm. leaving a small residue of heavy alkylate.

The alkyl benzene so prepared was sulphonated with 22% oleum by a conventional method, and the sodium salt of the sulphonic acid isolated. This was then tested as follows. In the incubation test, solutions of 3–5 p.p.m. of sulphonate in river water were seeded with sewage effluent (5 ml./litre of sewage effluent) and aerated at 20° C.

In both tests, samples were withdrawn at intervals and analyzed by the method of Longwell and Maniece (Analyst, 80, 167 (1955). The results after 23 days are shown in Table 1.

TABLE 1

| | Percent of Original Active Agent remaining after 23 days | |
|---|---|---|
| | Incubation Test | Aeration Test |
| Sulphonate derived from hexene dimer | 9.0 | 8.4 |
| Sulphonate from tetrapropylene benzene | 39.4 | 61.2 |
| Sulphonate from "Dobane/JN" alkylate (Sample obtained July 1957) | 12.9 | 8.2 |

The "Dobane/JN" was a commercially available alkylate giving a sulphonate relatively susceptible to biological attack. It is clear from these results that the hexene dimer product was at least as susceptible to biological attack as the commercial product, and much more susceptible than the propylene tetramer.

EXAMPLE 2

Catalyst A was prepared using pelleted silica/alumina base heated to 550° C. in air. The cooled base was immersed in 18% aqueous formaldehyde solution for 5 minutes and excess solution filtered off, the solid rinsed with water, and immersed in saturated potassium permanganate solution for 10 minutes. The excess solution was filtered off, and the catalyst washed with water to remove soluble inorganic materials. The solid catalyst was then dried at 120° C. before charging the reaction, where it was heated in a stream of air at 550° C. for 5 hours and cooled in a stream of dry inert gas before starting the polymerization reaction.

Catalyst B was prepared by impregnating the same base with an aqueous solution of manganese nitrate, followed by the drying and heating treatment (to decompose the nitrate and activate the catalyst) used for catalyst A.

These catalysts were used to dimerize normal hexenes under liquid phase conditions. The dimer fraction formed was separated from the total polymer by fractional distillation, and alkylated with benzene using anhydrous hydrogen fluoride as catalyst with a mole ratio of benzene to olefine of 20:1. The resulting alkylbenzene was separated from the total alkylate by fractionation, and converted to the sodium sulphonate by conventional oleum sulphonation. The biodegradability of the resulting alkylbenzene sulphonates was measured as described in Example 1. The main results of these tests, with the conditions of the dimerization, are shown in Table 2.

TABLE 2

| Run Number | 1 | 2 | 3 | 4 | 5 |
|---|---|---|---|---|---|
| Catalyst used | A | A | B | B | [1] B |
| Composition of Monomer Feed, wt. percent: | | | | | |
| n-Hexene-1 | 100 | 3 | 13 | 45 | 38 |
| Hexene-2 and -3 | Nil | 97 | 87 | 55 | 62 |
| Reaction Conditions: | | | | | |
| Temperature, °C | 80-90 | 80-90 | 80-90 | 110 | 130 |
| Feed Rate, lbs./lb. cat./hour | 1.2 | 0.6 | 1.4 | 1.3 | 1.1 |
| Pressure, p.s.i.g | 400 | 400 | 400 | 400 | 400 |
| Conversion of monomer, percent | 16 | 7 | 14 | 11 | 21 |
| Dimer formed, wt. percent of total polymer | 87 | 89 | 90 | 84 | 78 |
| Recovered monomer composition, wt. percent: | | | | | |
| Hexene-1 | 13 | 3 | 5 | 19 | 10 |
| Hexene-2 and -3 | 87 | 97 | 95 | 82 | 90 |
| Alkyl benzene sulphonate biodegradability, percent of original active agent remaining: | | | | | |
| After 23 days, incubation | 7.1 | 5.3 | | | |
| After 33 days, aeration | 7.4 | 11.0 | | | |

[1] Catalyst for this run was that used in Run 4 after regenerating by heating in a stream of air at 500-550° C.

EXAMPLE 3

The process described in Example 1 was repeated using a nickel oxide-silica-alumina (base containing 13% alumina) catalyst (C) prepared as in Example 1, or a nickel chloride catalyst (D) prepared as described in U.S. Patent 2,828,347.

The alkylbenzene and alkylbenzene sulphonates were prepared from the olefine dimer and tested for biodegradability in the same way as in Example 1. Results are given in Table 3.

TABLE 3

| Run Number | 1 | 2 | 3 | 4 | 5 |
|---|---|---|---|---|---|
| Catalyst used | C | C | C | D | [1] D |
| Composition of Monomer Feed, wt. percent: | | | | | |
| Hexene-1 | 100 | 66 | 39 | 40 | 29 |
| Hexene-2 and -3 | Nil | 34 | 61 | 60 | 71 |
| Reaction conditions: | | | | | |
| Temperature, °C | 80-90 | 80-90 | 80-90 | 80-90 | 80-9 |
| Feed rate, lbs./lb. cat./hour | 1.1 | 1.1 | 1.2 | 1.1 | 1.1 |
| Pressure, p.s.i.g | 400 | 400 | 400 | 400 | 400 |
| Conversion of monomer, percent | 5 | 7 | 66 | 10 | 12 |
| Dimer formed, wt. percent of total polymer | 86 | 87 | 88 | 91 | 92 |
| Recovered Monomer Composition, wt. percent: | | | | | |
| Hexene-1 | 59 | 40 | 26 | 4 | 4 |
| Hexene-2 and -3 | 41 | 60 | 74 | 96 | 96 |
| Alkylbenzene sulphonate biodegradability, percent of original active agent remaining: | | | | | |
| After 23 days, incubation | 8 8 | 7.1 | 5.3 | | |
| After 33 days, aeration | 12.0 | 7.2 | 6.3 | | |

[1] Regenerated catalyst after use in Run 4.

EXAMPLE 4

This illustrates the first dimerization step. A nickel oxide on silica-alumina catalyst was prepared by the impregnation method described by Holm et al. in Ind. Eng. Chem., 49, p. 250 (1957). A propylene feed derived from catalytic cracking of petroleum fractions was used, having the following composition:

| | Percent |
|---|---|
| $C_2$ hydrocarbons | 13 |
| Propylene | 57 |
| Propane | 28 |
| $C_4$ hydrocarbons | 2 |

No detectable amounts of acetylenes or propadiene were present.

The propylene feed was passed over the catalyst under liquid phase conditions at a pressure of 600 p.s.i.g, a temperature of 70-80° C. and a feed rate of 0.6 part per part of catalyst per hour, giving a total conversion of propylene to all products of 74%. The product was fractionated to separate unconverted propylene, giving a $C_6$ fraction of the following composition:

| | Percent |
|---|---|
| Below $C_6$ | 1.6 |
| 2.3-dimethylbutenes | 1.7 |
| Methylpentenes (predominantly 4 - methyl - 2 - pentene) | 50.6 |
| n-Hexenes (hexenes-1, -2 and -3) | 46.1 |

This product can be fractionated to give a n-hexene fraction containing only very small amounts of branched chain hexenes.

EXAMPLE 5

This example illustrates the second dimerization step. A manganese oxide/silica alumina catalyst was prepared as follows:

Pelleted silica alumina containing 13% alumina was ground to 18-30 mesh and heated to 550° C. in air to remove organic binding material.

The cooled granules were immersed in 18% formalin solution for 5 minutes and the excess formalin solution was filtered off. The granules were briefly rinsed with water and then immersed in saturated potassium permanganate solution for 10 minutes. The excess permanganate solution was filtered off and the granules washed thoroughly with water to remove all soluble inorganic materials. The solid catalyst containing precipitated manganese dioxide was dried at 120° C. before insertion in the polymerization reactor where it was heated in a stream of air at 550° C. for 5 hours before the polymerization reaction was started.

Fractions consisting substantially of n-hexene isomer mixtures were dimerised over the manganese dioxide/silica alumina catalyst and over the nickel oxide/silica alumina catalyst of Example 1. The dimerization product was fractionally distilled to recover unpolymerised n-hexenes overhead, and the residue was fractionated under reduced pressure to recover a predominantly $C_{12}$ product.

The distillate hexene dimer products were alkylated batchwise with benzene, using anhydrous hydrogen fluoride as catalyst, and the HF layer separated from the products. The hydrocarbon layer was washed with aqueous potassium hydroxide to remove the remaining traces of hydrogen fluoride, dried, and fractionated to remove unreacted benzene. The residue was then fractionated under reduced pressure to recover light alkylate, main detergent alkylate, and heavy alkylate products.

The detergent alkylate products were sulphonated in the conventional way, and the sodium salts of the sulphonic acid prepared. These sodium sulphonates were tested by incubating in dilute aqueous solution (ca. 10 p.p.m. of active agent) in river water seeded with sewage effluent, and the active agent contents remaining after 23 days measured.

The main yields and principal conditions in these tests are set out in the following table, which also includes the principal properties of the detergent alkylate and results of the biological oxidation tests:

TABLE 4

| Dimerisation Run Number | HP 2 | HP 3 | HP 4 | HP 7 |
|---|---|---|---|---|
| Dimerisation Catalyst | Nickel oxide/ silica alumina | | Manganese dioxide/ silica alumina | |
| Dimerisation conditions: | | | | |
| Temperature, °C | 80–90 | 80–90 | 80–90 | 80–90 |
| Pressure, p.s.i.g | 400 | 400 | 400 | 400 |
| Hexene flow rate vol./vol. catalyst/hr | 1.0 | 1.0 | 1.0 | 0.5 |
| Hexene converted to total polymer, percent | 5.2 | 6.9 | 16.2 | 7.0 |
| Hexene dimers in total polymer, percent | 86 | 87 | 87 | 89 |
| Alkylation Conditions: | | | | |
| Benzene:olefine:HF, Mole ratios | 20:1:20 | 20:1:20 | 20:1:20 | 20:1:20 |
| Alkylation temperature, °C | 10–15 | 10–15 | 10–15 | 10–15 |
| Residue time in alkylation, minutes | 90 | 90 | 90 | 90 |
| Alkylation Yields, parts per 100 parts Hexene Dimer Fed: | | | | |
| Light alkylate | 10 | 12 | 4 | 16 |
| Detergent alkylate | 105 | 110 | 130 | 116 |
| Heavy alkylate | | 17 | 8 | |
| Properties of Detergent Alkylate: | | | | |
| Boiling range, °C./760 mm | 255–295 | 255–297.5 | 255–301.5 | 255–297.5 |
| Refractive Index | 1.4854 | 1.4860 | 1.4861 | 1.4858 |
| Completeness of sulphonation,[1] percent | 98.1 | 98.3 | 98.6 | 98.6 |
| Colour | Water white | Water white | Water white | Water white |
| Biological Oxidisability Tests, percent of Active Agent Remaining after 23 days: | | | | |
| Incubation Test | 11 | 7 | 7 | 4 |

[1] The percentage of the alkylate sulphonated in a standard oleum sulphonation test, for which a figure of 97.5% is regarded as generally satisfactory.

In comparison with this example, biological tests on the sulphonate prepared from the usual propylene tetramer benzene detergent alkylate showed 66% residual active agent remaining after 23 days in incubation. The corresponding figure for sulphonates from a commercially available biologically "soft" sulphonate was 8% of active agent remaining.

EXAMPLE 6

A sample of 2-methyl-pentene-1 was dimerized using $BF_3$ as catalyst and the product was then fractionated to recover the $C_{12}$ olefinic product. This was then alkylated to benzene using hydrogen fluoride as catalyst under the conditions of Example 2, and the product fractionated. Very poor yields of the detergent alkylate were obtained, the great bulk of the $C_{12}$ olefine fragmenting during alkylation to form alkyl aromatics with short side chains.

A sample of 4-methyl-pentene-1 was dimersized over nickel oxide/silica alumina catalyst and converted to alkylbenzenes as in Example 2. A better yield of the $C_{12}$ alkylbenzene was obtained than from the 2-methylpentene-1 dimer, although large amounts of lower alkylbenzene were formed with this material and the detergent alkylate yield was much lower than with the normal hexene dimers. The alkylbenzene sulphonate was prepared and tested for biological oxidisability in the same way as in Example 2; the sulphonate was about as resistant to biological attack as the usual propylene tetramer benzene. A dimer of 4-methylpentene-1 prepared using a Ziegler catalyst system also gave on conversion to alkyl benzene sulphonate a product which was relatively resistant to biological attack.

These experiments illustrate the unsuitability of the methyl pentene dimers of propylene for use in the process and the necessity for separating the normal hexenes from the propylene dimers made in the first stage.

EXAMPLE 7

The tetramer ($C_{12}$) fraction of a total polymerisation product prepared as illustrated in Example 1 was recovered by fractionation, this representing the propylene tetramer product obtained in a single-stage polymerization from propylene. This was then converted to an alkylbenzene sulphonate by the alkylation methods given in Example 2. This sulphonate proved to be extremely resistant to biological attack, showing that biologically oxidizable products cannot be made by a single-stage polymerization of propylene on the oxide catalysts.

EXAMPLE 8

A sample of "Synclyst" brand silica/alumina cracking catalyst containing about 13% by weight of alumina was sieved and the 18–30 mesh fraction calcined at 550° C. for 5 hours. The product was charged to a flow reactor and heated in a stream of air at 540–550° C. for 4 hours, and allowed to cool in nitrogen.

A mixed normal hexene feed containing 21% of hexene-1 and 79% of hexene-2 and -3 was pumped over the catalyst at a rate of 1.3 gm./gm. catalyst/hour, a pressure of 400 p.s.i.g. and a temperature of 80–90° C. After processing about 60 parts of feed per part of catalyst the catalyst was regenerated by heating in a stream of air at 530–560° C. for about 5 hours and again cooled in nitrogen. Reaction of the hexenes was then resumed under the same conditions until a further 60 parts of feed per part of catalyst had been processed. Over the whole run, 7% of monomer was converted to polymer, the total hexene free polymer containing 87.5% of the dimer fraction boiling from 150–255° C. but mainly between 196–209° C./760 mm. For the first part of the run, recovered monomer contained 15% of hexene-1 and 85% of hexene-2 and -3, and the latter half of the run 4% of hexene-1 and 96% of hexene-2 and -3. No skeletal isomerization of the hexenes could be detected, although clearly considerable double-bond migration occurred.

The dimer product was alkylated to benzene using 20 moles of benzene and 20 moles of liquid hydrogen fluoride per mole of olefine, the reaction being carried out at 10–15° C. The hydrocarbon layer was separated, washed with alkali, dried and fractionated to remove unconverted benzene, the residue (benzene free) was then fractionated under reduced pressure to give a distillate detergent alkylate product boiling between 260 and 315° C./760 mm. in a yield equivalent to 130 parts by weight per 100 parts of olefine fed to the alkylation. In addition 6.9 parts of residual heavy alkylate and 7.4 parts of light alkylate per 100 parts olefine were obtained.

The detergent alkylate product was sulphonated and the sodium sulphonate submitted to biological degradation tests, by incubating or aerating under standard conditions with sewage bacteria. Results for an existing commercial biodegradable material are included for comparison.

| Sample of alkyl benzene sulphonate | Percent active agent remaining after 21 days | |
|---|---|---|
| | Incubation | Aeration |
| Product from Example 1 | 5.8 | 4.1 |
| Existing commercial biodegradable alkyl benzene sulphonate | 8.1 | 6.3 |

EXAMPLE 9

A sample of "Synclyst" brand silica/alumina cracking catalyst containing 13% by weight of alumina was sieved and the 18–30 mesh fraction heated in air at 550° C. for 7 hours. The product was charged to a tubular flow reactor, heated in a stream of air at 540 to 550° C. for 5 hours and allowed to cool in nitrogen.

A mixed normal hexene feed containing 24% hexene-1 and 76% of hexene-2 and hexene-3 was pumped over the catalyst at a temperature of 80–90° C. and a pressure of 400 p.s.i.g. The flow rate conditions and the conversion to total polymer over the course of the test were as follows:

| Hours on stream | Feed Rate, g./g. catalyst/hour | Conversion to total polymer, percent |
|---|---|---|
| 4-16 | 0.6 | 39.1 |
| 16-28 | 0.4 | 35.1 |
| 28-40 | 0.6 | 27.1 |
| 41-53 | 0.5 | 32.7 |
| 53-65 | 0.6 | 25.9 |
| 64-81 | 0.5 | 28.4 |
| 81-90 | 0.9 | 23.7 |
| 91-103 | 0.5 | 27.3 |
| 103-115 | 0.5 | 25.5 |

The total product from the above test was bulked and fractioned giving a recovered hexene fraction containing 96% of hexene-2 and hexene-3 and 4% of hexene-1, and a $C_{12}$ fraction boiling between 150° C. and 255° C. amounting to 83% of the total hexene-free polymer, the remainder being higher boiling polymer. This shows that the dimerization catalyst can be operated for reasonable times on stream between regenerations.

EXAMPLE 10

This illustrates the effect of reaction temperature. Reactions were carried out using the catalyst of Example 9, but with different reaction temperatures and flow rates, the pressure still being 400 p.s.i.g. The results were as follows:

| Reaction Temp., ° C. | Feed rate, vols./vol. Catalyst/hr. | Conversion to total polymer wt. percent of feed | $C^{12}$ content of total hexene-free polymer, wt. percent |
|---|---|---|---|
| 25 | 1.0 | 4.4 | 75 |
| 80-90 | 1.0 | 22.3 | 87.6 |
| 120-130 | 1.0 | 51 | 65.6 |

EXAMPLE 11

This illustrates regeneration of the catalyst by treating in a stream of nitrogen, and also shows that the catalyst can be activated in a nitrogen stream.

The 18–30 mesh fraction of a "Synclyst" silica/alumina catalyst containing 13% of alumina was activated in a flow reactor by heating to 350° C. in a stream of nitrogen for 5 hours. The catalyst was then cooled and a normal hexene feed containing 96% of hexene-1 and 4% of hexene-2 and hexene-3 pumped over the catalyst at a flow rate of 1 v./v./hr., a temperature of 80–90° C. and a pressure of 400 p.s.i.g. The conversion to total polymer was 44.4% over the first sixteen hours of the run, which was then continued until the conversion fell to about 8%. The $C_{12}$ content of the bulked hexene-free polymer from the whole of this test was 85.3%. The catalyst was then regenerated by treating with nitrogen for 5 hours at 350° C. After regeneration the polymerization was resumed under the same conditions as before, giving a conversion to total polymer during the first 16 hours of 30.4%. The run was again continued until the conversion to total polymer was about 8%. The bulked hexene-free polymer from the whole of this second part of the process contained 89.5% by weight of the $C_{12}$ product, indicating that this regeneration method had no adverse effect or the efficiency of $C_{12}$ formation from the normal hexenes.

EXAMPLE 12

This example illustrates the effect of activation temperature on the catalyst activity, and on the efficiency of formation of $C_{12}$ olefines from normal hexenes. A silica-alumina synthetic cracking catalyst containing 13% alumina was heated to various temperatures in air for 16 hours, and the resulting catalysts used in a dimerisation process with a normal hexene feed (consisting substantially of hexene-2), using a temperature of 63° C. and a flow rate of 1 volume/volume catalyst/hour. Each process was run for 6 hours and the total product analysed to determine the percentage of the hexenes converted to total polymer and the percentage of $C_{12}$ olefines in the hexene-free polymer. The results were as follows:

| Run No. | Activating Gas | Activation Temp., ° C. | Percent of hexenes converted to total polymer | Percent $C_{12}$ in the total hexene free polymer [1] |
|---|---|---|---|---|
| 1 | Air | 550 | 31 | 84 |
| 2 | Air | 650 | 30 | 60 |
| 3 | Air | 750 | 30 | 59 |
| 4 | Air | 850 | 28 | 53 |
| 5 | Nitrogen | 390 | 40 | 96 |
| 6 | do | 500 | 40 | 93 |
| 7 | do | 500 | 42 | 92 |
| 8 | do | 550 | 36 | 87 |

[1] Determined by gas chromatographic analysis of total polymer.

EXAMPLE 13

This example shows the use of silica/alumina catalysts containing 25% and 7% by weight of alumina. Each catalyst sample was activated in air for 16 hours at several temperatures, cooled and used for the dimerization of hexene-1 at a temperature of 63° C. and a flow rate of 1 volume/volume catalyst/hour under sufficient pressure to maintain liquid phase conditions. Each run was continued for 6 hours, and the conversion of hexene to total polymer and the percentage of $C_{12}$ (hexene-dimer) in the total polymer measured gas chromatographically for the product from each 6-hour run.

The results are shown in the following table:

| Run No. | Alumina Content of Catalyst, wt. percent | Activation Temp., ° C. | Wt. percent of hexene converted to total polymer | Wt. percent $C_{12}$ in total hexene free polymer |
|---|---|---|---|---|
| 1 | 7% alumina | 270 | 10 | 92 |
| 2 | 7% alumina | 320 | 14 | 97 |
| 3 | 7% alumina | 390 | 23 | 97 |
| 4 | 7% alumina | 580 | 18 | 92 |
| 5 | 7% alumina | 760 | 4 | 92 |
| 6 | 25% alumina | 250 | 27 | 88 |
| 7 | 25% alumina | 350 | 25 | 95 |
| 8 | 25% alumina | 450 | 29 | 96 |
| 9 | 25% alumina | 550 | 32 | 96 |
| 10 | 25% alumina | 605 | 22 | 80 |
| 11 | 25% alumina | 675 | 26 | 74 |
| 12 | 25% alumina | 675 | 27 | 79 |
| 13 | 25% alumina | 850 | 27 | 71 |

EXAMPLE 14

A commercial silica/magnesia catalyst containing 30% of magnesium oxide was activated in air for 30 hours at 580° C., allowed to cool and used in the dimerization of hexene-1 at 63° C. using a flow rate of 1 volume/volume catalyst per hour. In a 6-hour run a conversion to total polymer of 8% was obtained, the total hexene-free polymer from the process containing 23% of $C_{12}$ olefines.

I claim:
1. A process for the production of a $C_{10}$–$C_{16}$ olefin which has two or more branches, which comprises dimerizing a straight chain $C_5$–$C_8$ mono-olefin containing mainly internal olefins over a catalyst which comprises a synthetic petroleum cracking catalyst, recovering the $C_{10}$–$C_{16}$ olefin, and recycling undimerized $C_5$–$C_8$ straight chain mono-olefin containing mainly internal olefins to the dimerization reaction.

2. The process as claimed in claim 1 wherein the dimerization catalyst is an oxide of nickel, cobalt, manganese or chromium or mixtures thereof, deposited on silica/alumina.

3. The process as claimed in claim 2 wherein the dimerization catalyst is periodically reactivated by heating in a medium selected from the group consisting of air and inert gases.

4. The process as claimed in claim 1 wherein the synthetic petroleum cracking catalyst is silica/alumina.

5. A process as claimed in claim 4 wherein the silica/alumina contains from about 70–90% by weight of silica.

6. The process as claimed in claim 1 wherein the dimerization catalyst is activated by heating in a medium selected from the group consisting of air and inert gases to temperatures in the range 350 to 650° C.

7. The process as claimed in claim 1 wherein the dimerization catalyst is periodically reactivated by heating in a medium selected from the group consisting of air and inert gases.

8. The process as claimed in claim 1 wherein the dimerization of the $C_5$ to $C_8$ olefine is carried out at a temperature in the range of 20–150° C.

9. The process as claimed in claim 8 wherein the dimerization reaction is carried out at a temperature in the range from 70–130° C.

10. The process as claimed in claim 1 wherein the dimerization reaction is carried out at a temperature in the range 50 to 100° C.

11. The process as claimed in claim 1 wherein the dimerization reaction is carried out at a pressure in the range 20 to 500 p.s.i.g.

12. The process as claimed in claim 1 wherein the olefine flow rate in the dimerization reaction is in the range 0.1 to 10 volumes of liquid olefine per volume of catalyst per hour.

13. The process as claimed in claim 1 wherein the dimerization reaction is carried out under superatmospheric pressure.

14. The process as claimed in claim 1 wherein $C_{10}$ to $C_{16}$ olefine fraction is recovered from the dimerization product by fractional distillation at pressures below atmospheric pressures.

15. A process as claimed in claim 1 wherein the $C_5$ to $C_8$ olefine fed to the dimerization reaction consists essentially of n-hexenes.

16. A process as claimed in claim 15 wherein a fraction consisting substantially of only dimers of normal hexenes is separated from the dimerization reaction by fractional distillation.

17. In a process for the production of detergent alkylate which is biodegradable upon sulphonation which comprises alkylating an aromatic hydrocarbon in the presence of an alkylation catalyst with an olefin and recovering the detergent alkylate formed, the improvement wherein the olefin is a $C_{10}$–$C_{16}$ olefin having two or more branches produced by dimerizing a straight chain $C_5$–$C_8$ mono-olefin containing mainly internal olefins over a catalyst which comprises a synthetic petroleum cracking catalyst and recycling undimerized $C_5$–$C_8$ straight chain mono-olefins containing mainly internal olefins to the dimerization reaction.

18. In a process for the production of detergent alkylate which is biodegradable upon sulphonation which comprises alkylating an aromatic hydrocarbon in the presence of an alkylation catalyst with an olefin and recovering the detergent alkylate formed, the improvement wherein the olefin is a $C_{10}$–$C_{16}$ olefin having two or more branches produced by dimerizing a straight chain $C_5$–$C_8$ mono-olefin containing mainly internal olefins over a catalyst which comprises an oxide of nickel, cobalt, manganese, chromium or mixtures thereof deposited on silica/alumina, and recycling undimerized straight chain $C_5$–$C_8$ mono-olefin containing mainly internal olefins to the dimerization reaction.

19. A process for the production of a $C_{10}$–$C_{16}$ olefin fraction having two or more branches, which fraction contains a high proportion of $C_{12}$ olefin which comprises dimerizing a straight chain $C_5$–$C_8$ mono-olefin consisting essentially of mainly internal n-hexene in the presence of a catalyst comprising a synthetic petroleum cracking catalyst, recovering the dimer thus produced, and recycling undimerized straight chain $C_5$–$C_8$ mono-olefins containing mainly internal olefins to the dimerization reaction.

20. A process for the production of detergent alkylate which is biodegradable upon sulphonation, which comprises alkylating an aromatic hydrocarbon in the presence of an alkylation catalyst with an olefin and recovering the detergent alkylate formed, the improvement wherein the olefin is a $C_{10}$–$C_{16}$ fraction of olefins having two or more branches, which fraction contains a high proportion of $C_{12}$ olefin, produced by dimerizing a straight chain $C_5$–$C_8$ mono-olefin consisting essentially of mainly internal n-hexene in the presence of a catalyst comprising a synthetic petroleum cracking catalyst and recycling undimerized straight chain $C_5$–$C_8$ mono-olefin containing mainly internal olefins to the dimerization reaction.

References Cited

UNITED STATES PATENTS

| | | | |
|---|---|---|---|
| 2,718,526 | 9/1955 | Mammen | 260—671 X |
| 3,109,869 | 11/1963 | Chambers et al. | 260—671 X |
| 3,238,249 | 3/1966 | Mirviss et al. | 260—671 X |
| 3,193,596 | 7/1965 | Bown et al. | 260—683.15 X |
| 3,351,654 | 11/1967 | Gudelis. | |

FOREIGN PATENTS 852,079  10/1960  Great Britain.

DELBERT E. GANTZ, *Primary Examiner.*

CURTIS R. DAVIS, *Assistant Examiner.*

U.S. Cl. X.R.

260—505, 683.15